Figure 1:
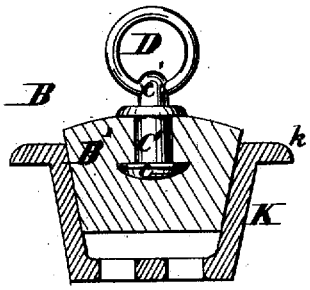

J. R. GIBSON & J. POWELL.

WASTE-WAY STOPPER.

No. 7,163. Reissued June 6, 1876.

WITNESSES

Walter Allen

A. H. Galt

INVENTOR

Joshua R. Gibson

James Powell

By Knight Bros Attorneys

N. PETERS, PHOTO-LITHOGRAPHER, WASHINGTON, D. C.

UNITED STATES PATENT OFFICE.

JOSHUA R. GIBSON AND JAMES POWELL, OF CINCINNATI, OHIO, ASSIGNORS TO SAID POWELL.

IMPROVEMENT IN WASTEWAY-STOPPERS.

Specification forming part of Letters Patent No. 117,402, dated July 25, 1871; reissue No. 7,163, dated June 6, 1876; application filed February 29, 1876.

DIVISION B.

*To all whom it may concern:*

Be it known that we, JOSHUA R. GIBSON and JAMES POWELL, both of Cincinnati, Hamilton county, Ohio, have invented a new and useful Improvement in Combined Wasteway Stoppers and Sockets for the class of baths, sinks, &c., whose interior surface may consist of wood or cast or sheet metal; and we hereby declare the following to be a full, clear, and exact description thereof, reference being had to the accompanying drawings, making part of this specification.

Our invention relates to that class of bath-tubs, sinks, or wash-trays, &c., in which a metallic socket or mouth-piece is placed in the opening in the bottom of the vessel for the ready discharge of the waste-water, and which metallic socket is, in the case of a wooden sink, secured to the same by screws passing through the rim of the socket, while, in the case of such vessels, sinks, or tubs lined with metal, the socket or bearing for the plug is attached to said lining by means of solder around the rim, the said wasteway being closed, when desired, by means of a plug or stopper.

In the ordinary construction of such socket or wasteways it has been customary to provide a plug or stopper in the waste-passage, of metal, porcelain, or other hard material; and when made in this form it has been necessary to bestow considerable labor upon such stoppers, and, finally, to grind them to their seats or bearings in the wasteway, in order to insure the retention of the water while being used.

The necessity of grinding applies equally, whether the stopper be of metal, or porcelain, or earthenware, and owing, to the weight and hardness of the material composing such stoppers, great damage is caused by careless operators dropping the stopper into the empty vessel or tub, and indenting or battering both the stopper and socket, thus injuring the bearing-surfaces, and causing the waste-passage to leak, and give great annoyance and loss from its use.

The metallic lining of bath-tubs, sinks, &c., is usually composed of thin sheet copper or brass tinned over, and planished or polished, and the wasteway-socket soldered thereto. Owing to the softness and weakness of the sheet-metal lining, the careless dropping of the common hard or heavy stoppers, as usually constructed, soon indents and cuts into the sheet-metal lining, so as, in many cases, to cause leakage in said lining, as well as in the waste-passage itself, and to cause great annoyance and loss from its use.

The object of our invention is to provide a light and highly elastic manufacture of stoppers, which shall preclude any possibility of indentation or defacement of the metallic lining or socket, and at the same time insure great economy and expedition of manufacture, and quite obviate the necessity of having to grind either stopper or socket to a bearing to secure a water-tight joint.

Figure 2:
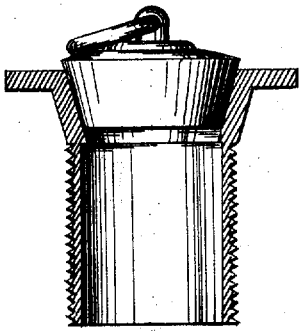

Figure 1 represents an axial section of one form of our plug, and of a corresponding metallic socket. Fig. 2 represents such a plug applied to a common screw-threaded socket-pipe.

B is the stopper or plug, made of vulcanized india-rubber, B′, or other analogous material. C is the shank or stem, terminating below in a swell, *c*, by which it is anchored within the plug, and above in a perforated head, *c′*, through which passes a ring, D, by which the plug is handled. The sides of the plug are made tapering to fit and occupy the corresponding hole or socket K.

The plug may be formed of solid rubber, pressed while in the plastic condition into an iron mold, and then vulcanized in the usual manner of preparing soft-rubber articles.

We do not confine ourselves to the precise form here shown, as several modifications may be made without departing from the principle of our invention. For instance, a solid rubber plug may be so formed as to have a raised stem or eye, *r*, to receive the ring D; or the rubber packing may take the form of a simple conical disk having a central orifice, through which the stem being passed is secured by means of a nut.

We claim as new and of our invention—

A wasteway-plug having its bearing-sides constructed wholly of rubber or equivalent yielding material, in combination with a metallic seat or socket, for the purposes set forth.

In testimony of which invention we hereunto set our hands.

JOSHUA R. GIBSON.
JAMES POWELL.

Attest:
GEO. H. KNIGHT,
S. B. SPEAR.